United States Patent [19]

Kurtz et al.

[11] Patent Number: 5,303,594
[45] Date of Patent: Apr. 19, 1994

[54] PRESSURE TRANSDUCER UTILIZING DIAMOND PIEZORESISTIVE SENSORS AND SILICON CARBIDE FORCE COLLECTOR

[75] Inventors: Anthony D. Kurtz, Teaneck, N.J.; Joseph S. Shor, Flushing, N.Y.

[73] Assignee: Kulite Semiconductor Products, Inc., Leonia, N.J.

[21] Appl. No.: 928,840

[22] Filed: Aug. 11, 1992

[51] Int. Cl.$^5$ .......................... G01L 7/08; G01L 9/06
[52] U.S. Cl. .................................. 73/727; 73/721; 338/4
[58] Field of Search ................ 257/77, 417, 418, 419; 338/4, 5, 36, 42, 47; 73/727, 726, 720, 721, 706, 708, 754; 29/621.1

[56] References Cited

U.S. PATENT DOCUMENTS

| | | |
|---|---|---|
| 3,800,264 | 3/1974 | Kurtz et al. |
| 3,930,823 | 1/1976 | Kurtz et al. |
| 4,320,664 | 3/1982 | Rehn et al. ............................ 73/708 |
| 4,768,011 | 8/1988 | Hattori et al. ........................ 338/5 |
| 5,165,283 | 11/1992 | Kurtz et al. ......................... 73/727 |

OTHER PUBLICATIONS

"High Voltage 6H-SiC p-n Junction Diodes", *Applied Physics Letters*, vol. 59, No. 14 Matus, et al., Sep. 1991 pp. 1770-1772.

"Diamond Depositions: Science and Technology", *Superconductivity Publications*, Nov. 1991 pp. 1, 5-7.

"Recent Developments in SiC (USA)", Powell et al. Dec. 1987.

"Electrical Characterization of the Oxide-Silicon Carbide Interface by MOS Conductance Techniques", Dept. of Engineering University of Notre Dame, Chaudry, et al. 1986.

"Selective Growth of Poly-Diamond Thin Films Using Selective Damaging by Ultrasonic Agitation on a Variety of Substrates", Dept. of Electrical Engineering, Auburn University, Ramesham, et al. 1991.

*Primary Examiner*—Richard E. Chilcot, Jr.
*Assistant Examiner*—Joseph L. Felber
*Attorney, Agent, or Firm*—Arthur L. Plevy

[57] ABSTRACT

A pressure transducer employing at least one piezoresistive sensor fabricated from diamond. The diamond piezoresistive sensors are formed on a dielectric layer fabricated from silicon dioxide. The dielectric layer is formed on a silicon carbide force collector. In addition, the silicon carbide force collector may be fabricated from α-silicon carbide or p-type silicon carbide.

18 Claims, 2 Drawing Sheets

PRESSURE TRANSDUCER UTILIZING DIAMOND PIEZORESISTIVE SENSORS AND SILICON CARBIDE FORCE COLLECTOR

FIELD OF THE INVENTION

This invention relates to pressure transducers and more particularly, to a pressure transducer employing diamond piezoresistive sensing elements and a silicon carbide force collector.

BACKGROUND OF THE INVENTION

Piezoresistive pressure transducers have a wide range of applications where accurate pressure monitoring is desirable. Typical applications include process monitoring, aerodynamics, engine testing, rotating machinery monitoring and testing, nuclear power and others. Generally, such transducers include a force collector and one or more piezoresistive elements. Frequently, it is desirable that such transducers are of small physical size and capable of operating at high temperatures.

One type of pressure transducer utilizes organic epoxy to bond sensors to a metal force collector. However, such transducers have disadvantages. A disadvantage is that repeated flexing of the force collector in response to pressure changes generally causes a weakening of the epoxy bond, thus degrading the accuracy of the transducer. In addition, the sensitivity of such transducers is typically low and degrades when the transducer is subjected to temperature variations. This limits the effective temperature range over which such transducers can be utilized.

Another type of prior art pressure transducer includes silicon (Si) sensors formed integrally with a Si force collector. Such monolithic transducers have pn junctions that isolate the sensors from the force collector. This type of transducer typically permits higher temperature operation. As is well known, however, the isolation between the sensor network and the force collector in such transducers deteriorates as a function of temperature. This is caused by thermally generated carriers which short circuit the sensors to the substrate. Typically, the isolation in such transducers deteriorates at temperatures above 350° F., causing a short and a degradation in performance.

One method utilized to circumvent the shorting problem associated with Si includes fabricating dielectrically isolated sensors. This is shown in U.S. Pat. No. 3,800,264 entitled HIGH TEMPERATURE TRANSDUCERS AND HOUSING INCLUDING FABRICATION METHODS which issued to A. D. Kurtz et al. and assigned to Kulite Semiconductor Products, Inc., the assignee herein. See also U.S. Pat. No. 3,930,823 issued on Jan. 6, 1976 to A. D. Kurtz et al. entitled HIGH TEMPERATURE TRANSDUCERS AND HOUSING INCLUDING FABRICATION METHODS. Transducers utilizing dielectrically isolated sensors are operable at temperatures in excess of 500° C. However, above 600° C. the Si sensing network and the Si force collector undergo plastic deformation, thus rendering the transducer inoperable.

Other materials have been investigated in order to provide a sensor that is operable at higher temperatures. Recent research has shown that silicon carbide (SiC) is an excellent semiconductor for high temperature applications and for use as a sensing element. Several high temperature devices have been manufactured from SiC, such as pn junction diodes that exhibit excellent rectification at 600° C. This is shown in an article entitled "High Voltage 6H—SiC p-n Junction Diodes" by Matus, L. G., Powell, J. A., and Salupo, C. S. in American Institute of Physics, Applied Physics Lett., Vol. 59, No. 14, pgs. 1770-1772, on Sep. 30, 1991.

In addition, SiC has been utilized for the fabrication of high temperature pressure transducers. In this regard, reference is made to copending U.S. patent application Ser. No. 07/694,490 entitled HIGH TEMPERATURE TRANSDUCERS AND METHODS OF FABRICATING THE SAME EMPLOYING SILICON CARBIDE, filed on May 2, 1991, and assigned to Kulite Semiconductor Products, Inc. Therein a high temperature transducer is described which uses pn junction isolated SiC sensing elements on a SiC force collector of opposite conductivity type. SiC enables a transducer to be operable at higher temperatures than previous transducers.

An important operating parameter for a pressure transducer is the level of the output signal it provides. A material property that this level depends on is the gauge factor associated with the material being used. Generally, a higher gauge factor yields a higher output signal level.

However, as is well known in the art, a disadvantage in utilizing SiC is that its gauge factor is relatively low. As shown in above noted U.S. patent application Ser. No. 07/694,490, the gauge factor associated with SiC is approximately 31. As is well known in the art, gauge factors in this range will cause a transducer using SiC to produce relatively low output signals. It is desirable to provide a transducer having a significantly higher gauge factor than that of SiC so that the transducer may provide higher output signals and that is operable at temperatures above which Si transducers undergo plastic deformation.

SUMMARY OF THE INVENTION

A pressure transducer comprising a substrate of a predetermined thickness fabricated from silicon carbide, said substrate having a top and bottom surface, a dielectric layer formed on said top surface of said substrate and at least one piezoresistive sensor fabricated from diamond formed on said dielectric layer.

DETAILED DESCRIPTION OF THE FIGURES

As is well known, piezoresistive pressure transducers include one or more piezoresistive elements and a force collector. In accordance with the present invention, the piezoresistive elements are fabricated from polycrystalline diamond (poly-diamond) film.

It is known that poly-diamond films possess excellent thermal properties. In addition, poly-diamond films are currently being investigated for heat sink and device applications. Moreover, poly-diamond has a gauge factor of approximately 100. This is described in an article entitled "Diamond Depositions: Science and Technology", Volume 2, Number 8, pgs 4 to 7, published on Nov. 22, 1991 by Superconductivity Publications Inc.

The gauge factor associated with poly-diamond is higher than that of silicon carbide (SiC), which has a gauge factor of 31 as described in copending U.S. patent application Ser. No. 07/694,490 entitled HIGH TEMPERATURE TRANSDUCERS AND METHODS OF FABRICATING THE SAME EMPLOYING SILICON CARBIDE, filed on May 2, 1991, and assigned to Kulite Semiconductor Products, Inc. Consequently, it is understood that poly-diamond is useful for high temperature sensing elements in the temperature range in which silicon (Si) begins to undergo plastic deformation and will provide higher output signals than sensors fabricated SiC due to its higher gauge factor.

In accordance with the present invention, the force collector is fabricated from SiC. As described in the above-noted patent application, there have been recent developments in obtaining single crystals of β-SiC (3C—SiC) and α-SiC (6H—SiC) semiconductors. SiC semiconductors have a wide bandgap (2.2 eV for 3C—SiC and 3 eV for 6H—SiC), a high melting point (2800° C.) and a large thermal conductivity. These factors make SiC an excellent semiconductor for high temperature applications. In addition, SiC is a structurally stronger material than Si, making it better for high temperature mechanical applications.

A pressure transducer will be now be described having sensing elements fabricated from poly-diamond and a force collector fabricated from single crystal SiC. The prior art does not disclose such a pressure transducer.

Figure 1:
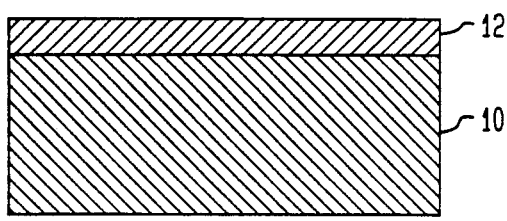
FIG. 1 is a side view of 3C—SiC epilayer formed on a substrate.

Referring to FIG. 1, there is shown a Si substrate 10. Grown on the top surface of the Si substrate 10 is a 3C—SiC epilayer 12. Techniques for growing SiC on Si surfaces are well known in the art. The growth of the 3C—SiC epilayer 12 is typically performed by means of chemical vapor deposition (CVD). This technique is described in an article entitled "Recent Developments in SiC (USA)" by Powell, J. A. and Matus, L. G. published in the Proceedings of the 1st International Conference on Amorphous and Crystalline SiC, held at Howard University, Washington, D. C. on Dec. 10 and 11, 1987. As will be described later, the 3C—SiC epilayer 12 will serve as a force collector or diaphragm. Typically, a thickness range between 3 and 20 microns is selected for the diaphragm, but this may vary depending on the application.

Figure 2:
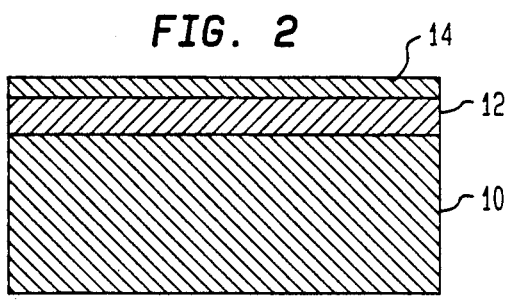
FIG. 2 shows a silicon dioxide layer formed on a 3C—SiC epilayer.
Figure 3:
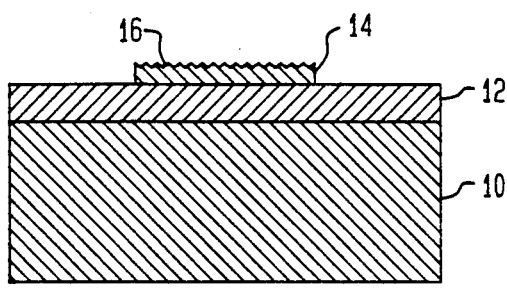
FIG. 3 shows an etched silicon dioxide layer having a damaged surface.

Referring to FIG. 2, there is shown a dielectric layer 14 formed on the 3C—SiC epilayer 12. The dielectric layer 14 may be formed by oxidizing SiC to form silicon dioxide ($SiO_2$). Techniques for oxidizing SiC are well known in the art and include oxidizing the SiC in a high temperature furnace in an oxygen atmosphere. It is known that SiC, when oxidized, forms a stable, electronic quality $SiO_2$ dielectric layer. This is described in an article entitled "Electrical Characterization of the Oxide-Silicon Carbide Interface by MOS Conductance Technique" by Chaudry, M. I. and Berry, W. B., in Material Research Society Symposium Proceedings, Volume 54 (1986). Consequently, it is understood that $SiO_2$ is useful for pressure transducer applications. The dielectric layer 14 is then selectively damaged as will be explained hereinafter. The damaged dielectric layer 14 is then patterned as desired using photolithography. Next, the dielectric layer 14 is etched using a standard oxide etch known in the art. Referring to FIG. 3, the dielectric layer 14 is shown after etching having a damaged surface 16. Alternately, the dielectric layer 14 may be formed on the 3C—SiC epilayer 12 by growing intrinsic diamond as will be explained. In order for this to be achieved, the 3C—SiC epilayer 12 is damaged prior to the growth of the intrinsic diamond.

Figure 4:
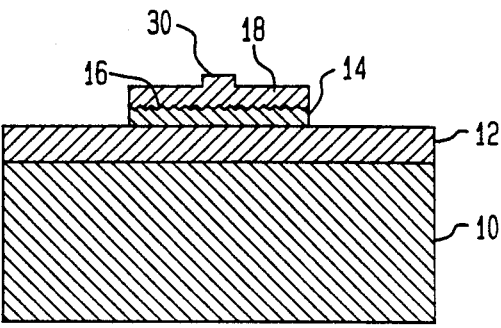
FIG. 4 shows a poly diamond layer including a poly diamond piezoresistive sensor formed on the damaged silicon dioxide surface.

Referring to FIG. 4, a poly-diamond layer 18 and a poly-diamond piezoresistive sensor 30 formed integrally with the poly-diamond layer 18 is shown on the damaged surface 16 of the dielectric layer 14. It is understood that a plurality of piezoresistive sensors may be formed integrally with the poly-diamond layer 18 as desired.

Growth of poly-diamond is well known in the art. In this regard, reference is made to a paper entitled "Selective Growth of Poly-Diamond Thin Films Using Selective Damaging by Ultrasonic Agitation on a Variety of Substrates", by Ramesham, R., Roppel, T. and Ellis, C. at a Spring 1991 meeting of the Material Research Society, Paper No. H9.5.

Typically, poly-diamond is grown by plasma assisted CVD in methane and hydrogen carrier gas. This is performed at approximately 914° C. and a pressure of 46 Torr at a forward and reflected power of 1200 Watts and 34 Watts, respectively. Growth of poly-diamond is severely inhibited on polished surfaces. As described in the above noted paper however, selective deposition of poly-diamond may be accomplished by selectively damaging a polished substrate surface. A method of selectively damaging a polished substrate includes ultrasonic agitation of the substrate in a diamond slurry. Therefore, by selectively damaging a patterned surface, nucleation occurs on areas that have been damaged. In this manner, thin film diamond sensors may be fabricated for use as piezoresistive sensors on a force collector. It is understood that poly-diamond may be patterned by other techniques known in the art. Such techniques include oxidation at temperatures above 800° C., plasma etching and selective deposition.

Moreover, selective deposition may be achieved on a variety of materials, such as Si or $SiO_2$. As shown in FIG. 4, the poly-diamond layer 18 is formed on the dielectric layer 14. Alternately, the poly-diamond layer 18 may be formed on the 3C—SiC epilayer 12 directly, wherein the dielectric layer 14 is not formed on the 3C—SiC epilayer 12 as previously described. The poly-diamond layer 18 may then be etched using standard techniques.

Figure 5:
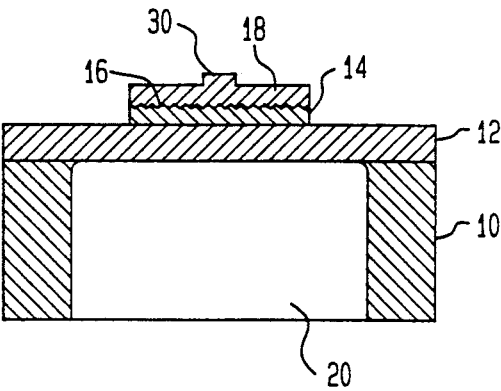
FIG. 5 shows the formation of a diaphragm by etching the silicon substrate.

The next step in the process is depicted in FIG. 5. In FIG. 5, the Si substrate 10 and the 3C—SiC epilayer 12 are shown in a cross sectional side view. The Si substrate 10 is shown etched to form an aperture 20 which is beneath the 3C—SiC epilayer 12 and the piezoresistive sensor 30. In this manner, the 3C—SiC epilayer 12 acts as a diaphragm. As described in the above noted U.S. patent application Ser. No. 07/694,490, the back of the Si substrate 10 may be patterned with a cup mask and etched using a known silicon etch such as a hydrofluoric acid (HF) and nitric acid (HNO₃) mix to form the aperture 20 within the Si substrate 10. Since SiC is inert to chemical etches, the 3C—SiC epilayer 12 acts as an etch stop. Consequently, the aperture 20 is formed to produce a diaphragm like structure.

Figure 6:
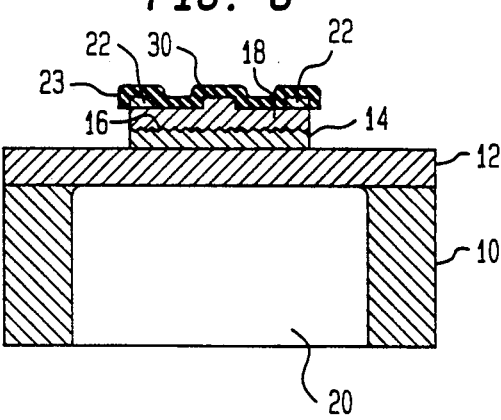
FIG. 6 shows the formation of ohmic contacts on the poly diamond layer and an insulating film over the piezoresistive sensor, ohmic contacts and poly diamond layer.

Referring to FIG. 6, the formation of ohmic contacts 22 which serve to contact the piezoresistive sensor 30 is shown. The ohmic contacts 22 are formed by depositing a metal on the poly-diamond layer 18 and patterning it using standard techniques. Metals which may be utilized as ohmic contacts 22 include gold (Au), titanium (Ti) and platinum (Pt). The force sensing resistors may be formed by masking the poly-diamond layer 18 and then fabricating the resistors by patterning techniques known in the art.

The poly diamond layer 18, piezoresistive sensor 30 and ohmic contacts 22 form a sensing network which is then passivated. Passivation may be achieved by depositing an insulating film 23 fabricated from silicon nitride (SiN) or SiO₂ over the poly diamond layer 18, piezoresistive sensor 30 and ohmic contacts 22. The insulating film 23 serves to inhibit the diamond from oxidizing when exposed to high temperature environments.

Alternately, the force collector may be formed from a SiC wafer that is selectively etched using electrochemistry. As described in the above noted "Recent Developments in SiC (USA)" article, bulk 6H—SiC may be grown by utilizing a sublimation process and SiC epilayers may be formed by using CVD. A method of electrochemically etching a SiC wafer is described in U.S. patent application Ser. No. 07/777,157 entitled METHOD FOR ETCHING OF SILICON CARBIDE SEMICONDUCTOR USING SELECTIVE ETCHING OF DIFFERENT CONDUCTIVITY TYPES, filed on Oct. 16, 1991, and assigned to Kulite Semiconductor Products, Inc.

Figure 7:
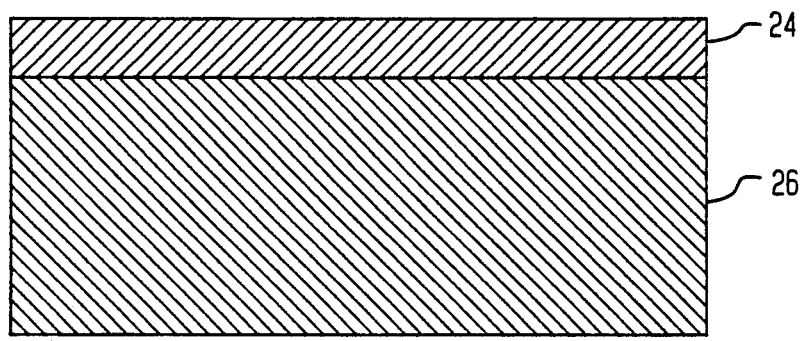
FIG. 7 shows the formation of a p-type 6H—SiC layer on an n-type 6H—SiC substrate.

According to this method, a SiC epilayer of a first conductivity type having a desired membrane thickness is grown on an underlying SiC substrate of a second conductivity type. Moreover, the epilayer is fabricated such that it has a higher potential for charge transfer than the underlying SiC substrate. Referring to FIG. 7, a p-type 6H—SiC epilayer 24 is shown grown on an n-type 6H—SiC substrate 26.

Figure 8:
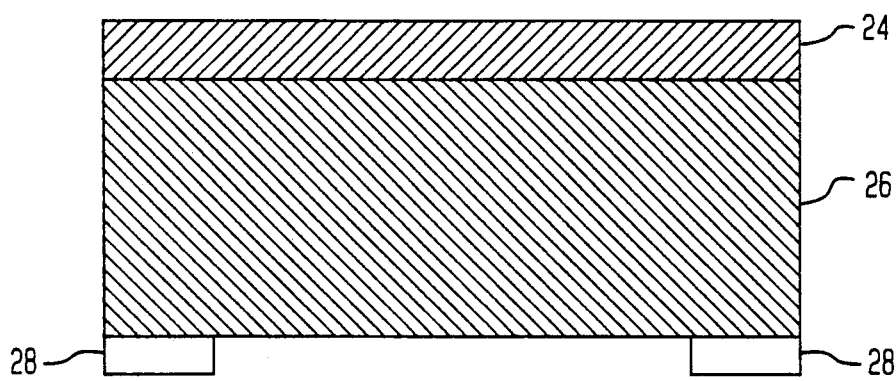
FIG. 8 shows the formation of a mask for etching the n-type 6H—SiC substrate.

Referring to FIG. 8, a mask 28 is applied to a bottom surface of the n-type 6H—SiC substrate 26. The mask 28 is patterned into a desired configuration using techniques known in the art. The material used to fabricate the mask 28 is any material able to withstand the HF electrolyte used for etching such as chromium.

Figure 9:
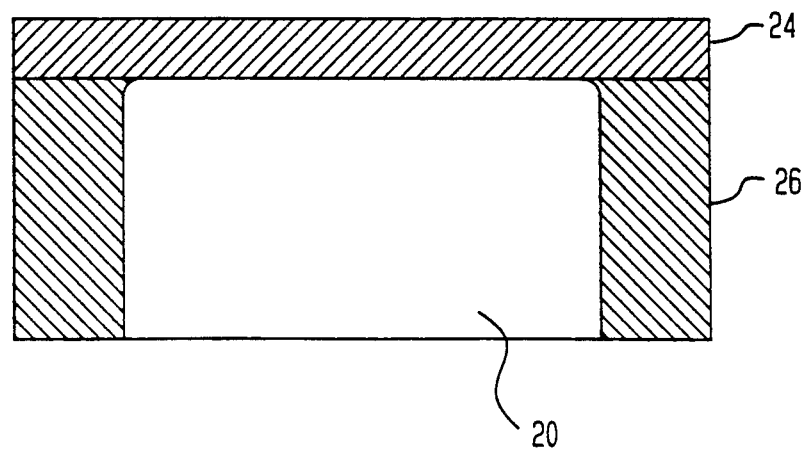
FIG. 9 shows the formation of the diaphragm by etching the n-type 6H—SiC substrate.

Referring to FIG. 9, the n-type 6H—SiC substrate 26 is then etched to form the aperture 20. This will result in a single crystal membrane which acts as a diaphragm and whose thickness is equal to the p-type 6H—SiC epilayer 24.

What is claimed is:

1. A pressure transducer, comprising:
   a diaphragm of a predetermined thickness fabricated from silicon carbide, said diaphragm having a top and bottom surface;
   a dielectric layer formed on said top surface of said diaphragm; and
   at least one piezoresistive sensor fabricated from diamond formed on said dielectric layer.

2. The pressure transducer according to claim 1, wherein said silicon carbide is β-silicon carbide.

3. The pressure transducer according to claim 1, wherein said dielectric layer is fabricated from silicon dioxide.

4. The pressure transducer according to claim 1, wherein said dielectric layer is fabricated from intrinsic diamond.

5. The pressure transducer according to claim 1, wherein said silicon carbide is p-type silicon carbide.

6. The pressure transducer according to claim 1, further including a diamond layer formed on said dielectric layer wherein said at least one piezoresistive sensor is integrally formed on said diamond layer and said diamond layer includes a contact coupled to said at least one piezoresistive sensor.

7. The pressure transducer according to claim 6, further including an insulating layer formed over said at least one piezoresistive sensor, said contact and said diamond layer to inhibit oxidation of said at least one piezoresistive sensor, said contact and said diamond layer.

8. The pressure transducer according to claim 1, wherein said predetermined thickness is between 3 and 20 microns.

9. The pressure transducer according to claim 1, further including an annular member secured to said bottom surface, said annular member having an aperture positioned underneath said at least one piezoresistive sensor to enable said diaphragm to deflect within said aperture when a force is applied on said diaphragm.

10. The pressure transducer according to claim 9, wherein said annular member is fabricated from silicon.

11. The pressure transducer according to claim 9, wherein said annular member is fabricated from silicon carbide.

12. A force sensitive device, comprising:
   a substrate of a predetermined thickness fabricated from silicon carbide, said substrate having a top and bottom surface;
   a dielectric layer formed on the top surface of said substrate; and
   at least one piezoresistive sensor fabricated from diamond formed on said dielectric layer.

13. The force sensitive device of claim 12, wherein said device is a pressure transducer and said substrate is a diaphragm.

14. The force sensitive device according to claim 12, wherein said silicon carbide is β-silicon carbide.

15. The force sensitive device according to claim 12, wherein said silicon carbide is p-type silicon carbide.

16. The force sensitive device according to claim 12, wherein said predetermined thickness is between 3 and 20 microns.

17. The force sensitive device according to claim 12, further including an annular member secured to said bottom surface, said annular member having an aperture positioned underneath said at least one piezoresistive sensor to enable said diaphragm to deflect within said aperture when a force is applied on said diaphragm.

18. The force sensitive device according to claim 17, wherein said annular member is fabricated from silicon carbide.

* * * * *